United States Patent [19]

Saville et al.

[11] 3,889,923

[45] June 17, 1975

[54] LEAKAGE RESISTANT FITTING

[75] Inventors: Eric J. Saville, Claremont; Raymond S. Hunt, Jr., Upland, both of Calif.

[73] Assignee: PneuDraulics, Inc., Montclair, Calif.

[22] Filed: May 7, 1973

[21] Appl. No.: 358,045

[52] U.S. Cl. ................ 251/170; 251/311; 251/334; 285/110
[51] Int. Cl. ............................................ F16k 15/08
[58] Field of Search ........... 251/170, 171, 172, 173, 251/174, 144, 145, 146, 309, 310, 311, 312, 314, 334; 285/151, 156, 182, 190, 197, 110

[56] References Cited
UNITED STATES PATENTS

| | | | |
|---|---|---|---|
| 2,192,339 | 3/1940 | Wilson | 251/334 |
| 2,497,139 | 2/1950 | Rumbaugh | 251/310 X |
| 2,573,177 | 10/1951 | Bohlen | 251/174 X |
| 2,777,664 | 1/1957 | Bryant | 251/174 |
| 3,037,738 | 6/1962 | Jackson | 251/174 X |
| 3,458,172 | 7/1969 | Burrows | 251/174 |
| 3,502,355 | 3/1970 | Demler | 285/110 |
| 3,672,704 | 6/1972 | Christianson | 285/110 |

*Primary Examiner*—Harold W. Weakley
*Attorney, Agent, or Firm*—Boniard I. Brown

[57] ABSTRACT

A leakage resistant fitting for fluid handling systems. The fitting has two members with confronting boundary surfaces which define a potential interfacial leakage space between the members. One member has an integral resiliently flexible sealing flange bounded at one side by the boundary surface of the member, and means for urging the flange into sealing contact with the boundary surface of the other member to block fluid leakage through the interfacial leakage space. The described fitting is a valve in which the fitting members constitute a valve body and movable valve member, respectively. The valve body and member have fluid passages opening through their confronting boundary surfaces which are aligned for communication with one another when the valve member occupies its open position and are misaligned when the valve member occupies its closed position. The valve body has a resilient annular sealing flange surrounding the open end of its passage which is urged into sealing contact with the valve member by a compression screw threaded in the body passage to block fluid leakage between the body and valve member in both the open and closed positions of the member.

8 Claims, 4 Drawing Figures

LEAKAGE RESISTANT FITTING

BACKGROUND OF THE INVENTION

1. Field of the Invention:

This invention relates generally to fluid conducting fittings for fluid handling systems having a potential interfacial leakage space between different members of the fittings. The invention relates more particularly to such a fitting having novel sealing means for blocking fluid leakage through the interfacial leakage space.

2. Prior Art:

Most fluid handling systems, including both gas and liquid handling systems, embody a variety of fluid conducting fittings having a fluid passage and separate members with confronting boundary surfaces defining an intervening interfacial potential leakage space through which fluid may leak from or into the fitting passage. Examples of such fittings are valves, couplings and the like.

The prior art is replete with a vast assortment of fluid sealing arrangements for sealing such fittings against fluid leakage through their interfacial leakage spaces. Sealing arrangements of this character, for example, are disclosed in U.S. Pat. Nos. 407,304; 1,187,620; 1,746,609; 1,956,919; 2,324,216; 3,184,217; and 3,516,638.

SUMMARY OF THE INVENTION

This invention provides an improved fluid sealing means for fittings of the character described. A fitting according to the invention includes two members with confronting boundary surfaces defining an intervening interfacial potential leakage space through which fluid leakage may occur to or from the fitting passage. One member is formed with an integral resiliently flexible sealing flange bounded at one side by the boundary surface of the member. A means is provided for urging this member into fluid sealing contact with the confronting boundary surface of the opposite member to block fluid leakage through the interfacial leakage space between the members.

The particular fitting described is a rotary valve wherein one member of the fitting is a valve body and the other member is a movable valve member, specifically a cylindrical rotor which rotates in a bore in the valve body. The wall of this bore and the outer cylindrical surface of the valve rotor constitute the boundary surfaces of the members which define therebetween the interfacial leakage space to be sealed. The body and rotor have fluid passages which open through these boundary surfaces in such a way that the passages are aligned and communicate with one another when the rotor occupies its open position. Rotation of the valve rotor to closed position rotates the passages out of alignment.

The invention, as embodied in this valve, comprises an annular sealing flange surrounding the end of the valve body passage which opens through the wall of the body bore. The surface of this flange facing the bore forms a portion of the bore wall. The flange has an annular body joined to the valve body by a surrounding thin resiliently flexible web, such that the flange body is flexible toward and away from the valve rotor. A compression screw is threaded in the body passage for urging the sealing flange against the valve rotor to seal the body to the rotor about the body passage in both the open and closed positions of the rotor.

DESCRIPTION OF THE PREFERRED EMBODIMENT

Figure 1:
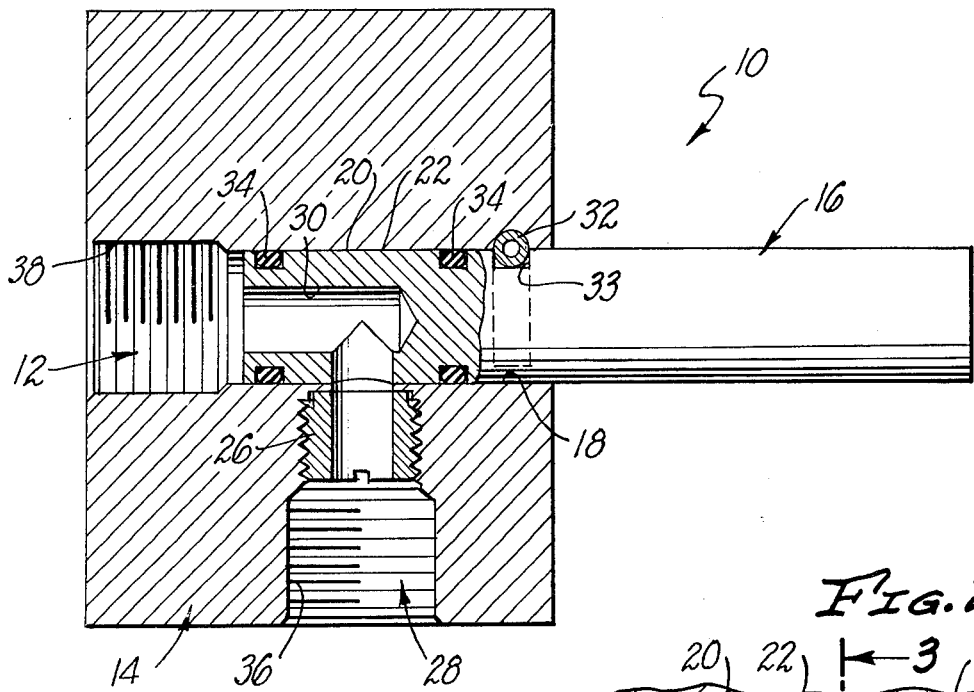
FIG. 1 is a section through a fluid conducting fitting, in this instance a valve, embodying the invention, the valve being shown in open position.

The drawings illustrate a fitting 10 according to the invention having a fluid passage 12 and two members 14, 16 with confronting boundary surfaces 18, 20, respectively. These surfaces define an intervening interfacial potential leakage space 22 through which fluid leakage may occur to or from the fitting passage 12. According to this invention, one fitting member, in this instance member 14, is formed with an integral, resiliently flexible sealing flange 24 bounded at one side by the boundary surface 18 of the member 14. A means 26 is provided for urging the flange into sealing contact with the boundary surface 20 of fitting member 16 to block fluid leakage through the space 22.

In the particular fitting shown, member 14 contains a portion 28 of the fitting passage 12 and member 16 contains another portion 30 of the passage. The sealing flange 24 is an annular flange surrounding the end of the passage 28 in member 14 which opens toward the member 16. The flange urging means 26 is a compression screw threaded in the passage 28 for adjustment toward the flange 24 to deflect the latter into sealing contact with member 16 about the full circumference of the latter passage.

Referring in greater detail to the drawing, the fitting 10 selected for illustration is a valve. Fitting member 14 is a valve body and fitting member 16 is a movable valve member contained by the body for movement between open and closed positions. Passage 28 in the valve body is a fluid inlet passage and passage 30 in the valve member is an outlet passage. In the open position (FIG. 1) of the valve member 16, the inlet and outlet passages 28, 30 are aligned for communication with one another to form the fitting passage 12. The body sealing flange 24 then engages the boundary surface 20 of the valve member 16 about the adjacent end of the outlet passage 30. In the closed position (FIGS. 2, 3) of the valve member 16, the passages 28, 30 are misaligned and the sealing flange 24 engages the valve member boundary surface 20 at a location spaced from the passage 30 to seal the inlet passage 28.

The particular valve 10 shown is a rotary valve wherein the valve body 14 has a block-like shape. The movable valve member 16 is a cylindrical shaft-like rotor which fits rotatably within a bore in the body. The wall of this bore and the outer cylindrical surface of the rotor 16 within the bore constitute the bondary surfaces 18, 20, respectively. The interfacial leakage space 22 is thus an annular leakage space surrounding the rotor 16. The valve rotor 16 is retained in the valve body bore by a pin or key 32 carried by the body and engaging in a slot 33 in the rotor. This key and slot retaining means permits turning of the rotor 16 between its open position of FIG. 1 and its closed position of FIGS. 2, 3. Contained in circumferential grooves in the rotor are seal rings 34 which engage the body bore wall 18 to provide secondary fluid seals between the valve body and rotor. The sealing flange 24 provides the primary seal.

As noted earlier, the body passage 28 is an inlet passage. This inlet passage extends through the valve body 14 transverse to its bore and opens at its inner end through the bore wall 18 into the bore. The outer end of the passage opens through an outer face of the body and is threaded to form an inlet port 36 for connection to a fluid conduit (not shown). The valve outlet passage 30 extends axially through the inner end of the valve rotor 16 and opens axially through the end face of the rotor and radially through the cylindrical boundary surface 20 of the rotor in a plane normal to the rotor axis containing the body inlet passage 28. Opening through a face of the valve body 14, on the axis of the rotor 16, is a threaded outlet port 38 for connection to a fluid conduit (not shown). This outlet port opens axially inward to the rotor outlet passage 30.

In the open position (FIG. 1) of the valve rotor 16, the radial end of its passage 30 is aligned and communicates with the inner end of the body passage 28. When the rotor occupies its closed position (FIGS. 2, 3), these passages are circumferentially spaced, as shown in FIG. 3.

Figure 2:
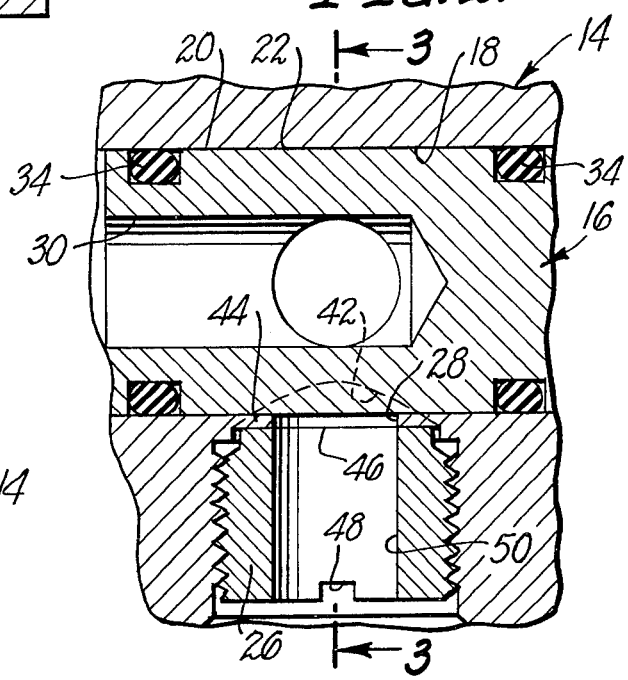
FIG. 2 is a fragmentary section similar to FIG. 1 showing the valve closed.
Figure 3:
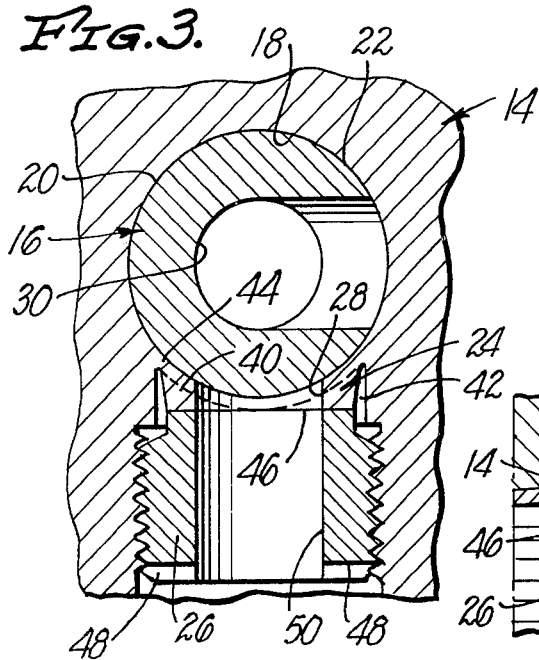
FIG. 3 is a section taken on line 3—3 in FIG. 2.
Figure 4:
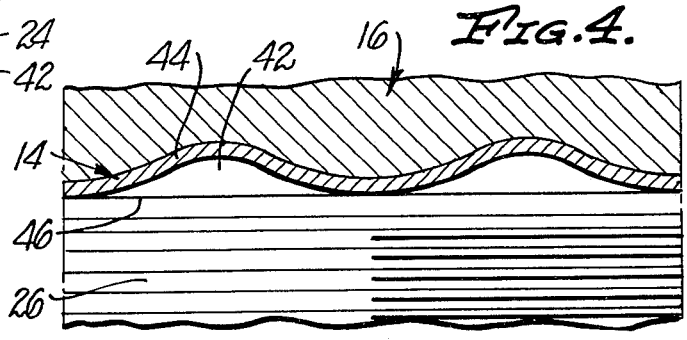
FIG. 4 is a development of the valve sealing means.

Referring particularly to FIGS. 2, 3 and 4, the annular sealing flange 24 of the valve 10 has a relatively thick and rigid body 40 surrounding the inner end of the valve body inlet passage 28 and spaced from the passage wall by a narrow annular clearance space or gap 42. The inner end of this flange body, that is the end nearest the valve body bore, is integrally joined to the valve body 14 by a relatively flexible annular web 44. The inner surface of this flange body 40 and web 44 is furnished by or forms a portion of the cylindrically curved wall 18 of the valve body bore and hence conforms to the outer cylindrical surface of the valve rotor 16. As shown, the axial depth of the gap or clearance space 42 about the flange 40, measured from the outer flange body end face 46, varies about the flange in such a way that the flange web 44 has a generally uniform thickness about its full circumference.

The sealing flange compression screw 26 has an inner end face which seats against the flange body end face 46, such that the sealing flange 24 may be deflected into sealing contact with the valve rotor 16 by threading the screw toward the flange. The screw has slots 48 to receive a tool for this purpose. A fluid passage 50 extends axially through the screw.

In use of the valve 10, the compression screw 26 is adjusted to urge the sealing flange 40 against the valve rotor 16 with sufficient force to prevent fluid leakage through the leakage space 18 while permitting rotation of the rotor between its open and closed positions. While the invention has been disclosed in a valve, it obviously may be embodied in other forms of fluid conducting fittings, such as couplings and the like.

We claim:

1. A leakage resistant fitting for fluid handling systems comprising:

first and second relatively movable members having confronting boundary surfaces defining an intervening interfacial potential leakage space and fluid passages in said members, respectively, each opening at one end through the boundary surface of the respective member for conducting fluid through said fitting in a manner such that fluid flow occurs from one passage to the other across said leakage space, means for retaining said members in assembled relation, said one end of the passage in one member being reduced in diameter to form at the latter passage end a radially inwardly projecting resiliently flexible annular sealing flange formed integrally with and comprising the same material as said latter member, said flange surrounding said one end of the passage in the latter member and being bounded at one side by said boundary surface of the latter member and at the other side by a surface facing the opposite end of the latter passage, and a compression sleeve threaded in the passage in said one member between said sealing flange and opposite passage end and engageable with said latter sealing flange surface for urging said sealing flange into fluid sealing contact with the boundary surface of the other member to block fluid leakage through said space.

2. A leakage resistant fitting for fluid handling systems comprising:

first and second relatively movable members having confronting boundary surfaces defining an intervening interfacial potential leakage space and fluid passages in said members, respectively, each opening at one end through the boundary surface of the respective member, means for retaining said members in assembled relation, one member having a resiliently flexible annular sealing flange formed integrally with and comprising the same material as said latter member, said flange surrounding said one end of the passage in the latter member and being bounded at one side by said boundary surface of the latter member, means for urging said sealing flange into fluid sealing contact with the boundary surface of the other member, and said members being relatively movable between valve open positions wherein said passages are aligned for communication with one another and said sealing flange engages the boundary surface of said other member about said one end of the passage in the latter member and valve closed positions wherein said passages are misaligned and said sealing flange engages the boundary surface of said other member at a location displaced from said one end of the passage in said other member to seal said one end of the passage in said one member.

3. A leakage resistant fitting according to claim 2 wherein:

said members are relatively movable in rotation between said open and closed positions, and said boundary surfaces are circularly curved about the axis of the relative rotation of said members.

4. A leakage resistant fitting according to claim 1 wherein:

said sealing flange has a relatively rigid annular body concentrically disposed within and radially spaced from the wall of the passage in said one member, and a relatively thin resiliently flexible annular web integrally joining said one member and flange body.

5. A leakage resistant fitting for fluid handling systems comprising:
a first member having a bore with a central axis and a second member slidable in said bore, whereby said members have confronting inner and outer boundary surfaces, respectively, circularly curved about the axis of said bore and defining an intervening interfacial potential leakage space,
said members having fluid passages, respectively, each opening at one end through the boundary surfaces of the respective member for conducting fluid through said fitting in a manner such that fluid flow occurs from one passage to the other across said leakage space,
means for retaining said members in assembled relation,
one member having a resiliently flexible annular sealing flange formed integrally with and comprising the same material as said latter member, said flange surrounding said one end of the passage in the latter member and being bounded at one side by said boundary surface of the latter member, and
means for urging said sealing flange into fluid sealing contact with the boundary surface of the other member to block fluid leakage through said space to and from at least the passage in said one member.

6. A leakage resistant fitting according to claim 5 wherein:
said sealing flange has a relatively rigid annular body concentrically disposed within and radially spaced by a narrow annular clearance space from the wall of the passage in said one member, a seating face on said flange body at the other side of said flange, and a relatively thin annular resilient web extending across the end of said clearance space adjacent said bore and joining said one member and flange body,
the axial depth of said annular clearance space relative to said flange seating face varying about the flange in a manner such that said flange has a generally uniform thickness about its full circumferential extent,
said flange body and web are bounded at said one side of the flange by said boundary surface of said one member, and
said urging means comprises a compression screw threaded in said passage of said one member and against said flange seating face to urge said flange against said other member.

7. A leakage resistant fitting according to claim 6 wherein:
said fitting is a valve,
said one member comprises the valve body,
said other member comprises a valve member movable in said body bore between a valve open position wherein said passages are aligned for communication with one another and said sealing flange engages said other member about said one end of its passage and a valve closed position wherein said passages are misaligned and said sealing flange engages the boundary surface of said movable valve member at a location spaced from said one end of the passage in the latter member to seal said one end of said body passage.

8. A leakage resistant fitting according to claim 7 wherein:
said movable valve member is rotatable about the axis of said body bore between open and closed positions.

* * * * *